UNITED STATES PATENT OFFICE.

JOHANN BAPTIST OBERNETTER, OF MUNICH, BAVARIA, GERMANY, ASSIGNOR TO B. F. POWELSON AND ADOLPH MUELLER, OF DETROIT, MICHIGAN, AND W. A. COOPER AND W. E. LINDOP, OF ST. THOMAS, CANADA.

IMPROVEMENT IN PHOTO-MECHANICAL PRINTING.

Specification forming part of Letters Patent No. 208,114, dated September 17, 1878; application filed July 17, 1878.

*To all whom it may concern:*

Be it known that I, JOHANN BAPTIST OBERNETTER, of Munich, in the Kingdom of Bavaria and Empire of Germany, have invented a new and useful Improvement in Printing Photographs, of which the following is a specification:

This invention has reference to an improvement in the art or process of preparing photographic plates for printing by mechanical means with common lithographic inks and presses, in such a manner that transparent or non-transparent plates may be employed, and in the prints the so-called "half-tones" brought out in superior manner, so as to give them entirely the appearance of the common photographic albumen prints. The process is thereby adapted to the practical wants and requirements of photographers, as any number of photographs may be printed from the plate in cheap and rapid manner, and in colors of absolute permanency.

Heretofore photographs were printed from transparent glass plates, in which a film of chrome-gelatine is subjected to the action of the light from the back, so as to render it insoluble next to the glass, while the outer surface remains adhesive, so as to unite with the second or sensitive film that receives the photographing image.

In my process the exposure to light for hardening the film of chrome-gelatine from the back is entirely dispensed with, and therefore my process not confined to transparent plates alone, but may be used with any non-transparent plate, which has the further advantage of doing away with the long time required by other methods of preparing plates for printing, and of finishing the printing-plates within a few hours, and obtaining at the same time results that have never been achieved with the present well-known helio-printing processes.

The invention consists, essentially, of forming on a transparent or non-transparent photographic printing-plate a film by a solution of albumen and soluble glass, and coating this film, after it is perfectly dry, by a second or sensitive film, that receives the photographing image from the negative, in the usual manner.

The first solution, by which the glass or metal printing-plate is coated by means of a brush or otherwise, is formed of seven parts of albumen, three parts of soluble glass, and eight parts of water. The film obtained by this solution is then dried, either slowly by exposure to the air, or quickly by artificial heat, as desired. When the film is perfectly dry it is washed in running water for about five minutes, care, however, being taken that its surface is not touched. After washing, the plate is placed in a rack and allowed to dry. The dry plate is then placed into a heating-oven, and when heated to about 212° Fahrenheit, or nearly so, the second or sensitive film is laid on the first film. This sensitive solution is prepared by dissolving fifty grams of gelatine, fifty grams of fish-glue, and fifteen grams of bichromate of ammonia in one thousand grams of water, and filtering it in warm state through paper. As soon as this solution is uniformly distributed over the plate, the same is placed in the oven again for ten or fifteen minutes, until perfectly dry. The plate is then ready for the negative, and is exposed to the action of the light in the same manner as the common albumen paper, but only for about half the time, so as to receive the photographing image on the sensitive film. After the plate has thus been exposed to the light for the proper length of time, it is washed in running water for from fifteen to twenty minutes, until every particle of chrome-salt not affected by the light is washed out.

After drying, the plate is ready for printing by the common lithographic inks and presses, furnishing prints that are fully equal in every respect to those on albumen paper, and that have all the half-tones and finish of common photographs. The plates may be prepared in advance and used whenever required, producing the prints in cheaper and quicker manner, and relieving photographers from the uncertainty connected with the sun-light in printing, and doing away with the most disagreeable portion of their work.

The printing of photographic pictures is thus accelerated and reduced entirely to a mechanical process, which facilitates their reproduction in any numbers, and admits of an extended application in the photographic and other arts.

Having thus described my invention, I claim as new and desire to secure by Letters Patent—

1. The process of preparing photographic plates for printing from by mechanical means, which consists in forming first on a transparent or non-transparent plate a coating or film of albumen and soluble glass, and then applying thereto a second or sensitive film for receiving the photographic image, substantially as herein set forth.

2. As a new article of manufacture, a photographic printing-plate provided with a ground coating of albumen and soluble glass, and a superposed sensitive coating or film, substantially as and for the purpose set forth.

JOHANN BAPTIST OBERNETTER.

Witnesses:
G. HENRY HORSTMANN,
W. A. COOPER,
   *U. S. Consulate, Munich.*